United States Patent [19]

Ramey

[11] 4,026,270
[45] May 31, 1977

[54] COMBINATION HEAT ABSORBER AND HEAT STORAGE SYSTEM

[76] Inventor: Harry B. Ramey, Box 272, Rte. 5, Berea, Ky. 40403

[22] Filed: Jan. 6, 1975

[21] Appl. No.: 538,586

[52] U.S. Cl. .............................................. 126/271
[51] Int. Cl.² .......................................... F24J 3/02
[58] Field of Search ............ 126/270, 271; 62/238, 62/325; 237/1 A

[56] References Cited

UNITED STATES PATENTS

| | | | |
|---|---|---|---|
| 1,034,465 | 8/1912 | Kennedy et al. | 126/271 |
| 2,213,894 | 9/1940 | Barry | 126/271 |
| 2,342,211 | 2/1944 | Newton | 126/271 |
| 2,396,338 | 3/1946 | Newton | 126/271 |
| 2,575,478 | 11/1951 | Wilson | 237/1 A |
| 3,236,294 | 2/1966 | Thomason | 126/271 |
| 3,250,269 | 5/1966 | Sherock | 126/271 |
| 3,894,528 | 7/1975 | Stubblefield | 126/271 |

*Primary Examiner*—Lloyd L. King

[57] ABSTRACT

A brine tank similar to that used in an ice plant is used to store heat added to a thin sheet of water by the sun and/or ambient air. The stored heat is removed from the water by a heat pump for space heating. Water in containers in the brine may, on occasion, furnish its heat of fusion to the evaporator of the heat pump. In hot weather a reversing valve causes the erstwhile evaporator to become the condenser and to transfer heat to the brine. This heat is then dissipated by the water when it is sprayed onto the roof.

2 Claims, 3 Drawing Figures

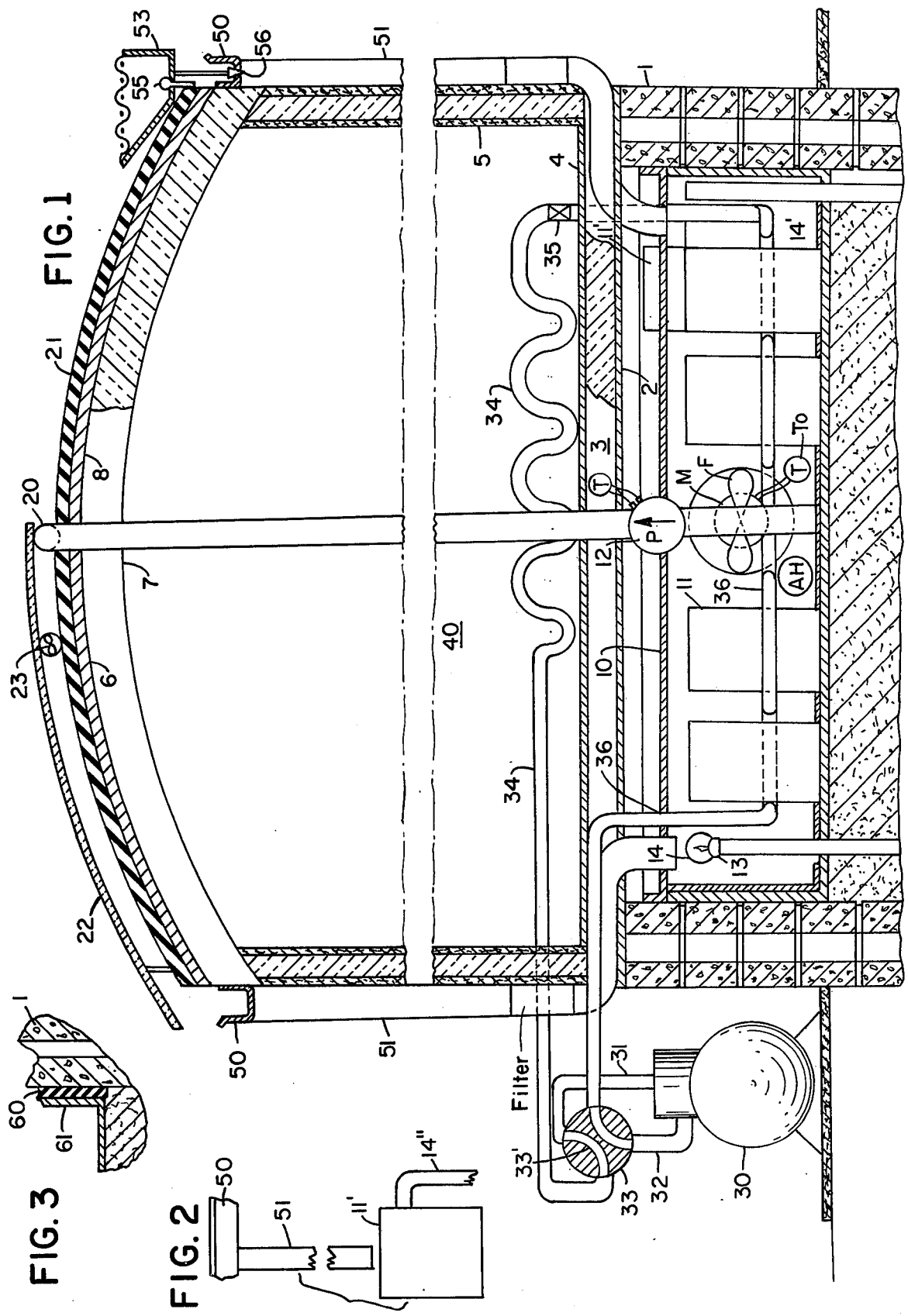

COMBINATION HEAT ABSORBER AND HEAT STORAGE SYSTEM

BRIEF SUMMARY OF THE INVENTION

The present invention relates to the combination of a heat absorber and a heat storage system. Solar heat and the ambient air, heat cold water to the ambient temperature or, on sunny days, above the temperature of the ambient air. Such heating may occur on the roof of a dwelling unit. The water is caused to flow to another location where its heat is removed by a heat pump ad used for space heating. The roof may be covered by a transparent sheet of material to prevent loss of heat on clear, cold days, and a fan may be used to blow air over the roof on cloudy days to add atmospheric heat to the water which is relatively cold because its heat has been removed by the heat pump.

Many dwelling units of the trailer type are permanently located, and the present invention is readily adaptable to such units. When so adapted, aesthetics and space usage require that the absorber be on the roof and that the heat storage tank be hidden beneath the trailer.

The heat storage tank is comparable in size to the well known children's wading pool. In its use it resembles the brine tank used in an ice plant. Fresh water containers may be placed in the brine tank and cooled below the freezing temperature of water. Thus, the heat pump not only removes the energy indicated by the specific heat of water but also the heat of fusion. As the temperature of the water is being lowered to the freezing point, the temperature difference between the evaporator coil and the water becomes smaller and smaller and thus more unfavorable, but while the water is being frozen, this temperature difference remains constant.

During periods when the sun is not shining and the temperature is extremely low, the brine may also be made to give up its heat of fusion.

In the drawing:

FIG. 1 is a schematic showing of the invention as it would be installed in a trailer type dwelling unit.

FIG. 2 shows a container used to receive rain water from a downspout.

FIG. 3 shows a flexible liner for the foundation and which forms an impervious container for receiving a brine solution.

DETAILED DESCRIPTION

As shown in FIG. 1, a trailer type dwelling unit comprises a foundation 1, vapor barrier 2, floor support 3, floor 4, walls 5, ceiling 6, ceiling support 7, and roof 8.

A tank 10 rests, preferable, on the ground beneath the trailer. Inside the tank 10 several containers 11 rest on the tank bottom. A pump 12 receives cold water or brine and lifts it to the spray pipe 20 above roof 8. A level control valve 13 includes a float 14.

A compressor 30 may be located near the foundation 1. High pressure line 31 and low pressure line 32 are connected to compressor 30. Valve 33, in the position shown, allows high pressure refrigerant fluid to flow through valve passage 33' into condenser 34. Conventional devices such as air fans and water circulators, omitted for clarity, may be used to aid in the condensation. A valve 35 restricts the flow from the condenser and enables compressor 30 to lower the pressure in line 36 whereby the evaporation inside lowers the temperature and causes line 36 to absorb heat from the water in tank 10. This heat is transferred to the interior 40 by the fluid flowing through compressor 30 to line 34 where condensation causes it to give up its heat.

The water from spray pipe 20 flows over the roof or over protective cover 21, such as asphalt. The sprayed water serves as a heat absorbing material both by virtue of its exposure to the atmosphere and its exposure to the black surface heated by the sun. Thus, the heat depletion by lines 34 and 36 is compensated for by heat restored to the roof top water. The water and its new energy flows through gutters 50 and downspout 51 back to tank 10.

The operation described above will continue in most temperate climates during average winter temperatures. Even if the sun is not shining, the heat content of the air restores the heat removed by the evaporator 36.

On extremely cold by sunny days the water returned to the roof is near the outside temperature and will not, like the water in other types of solar heaters, lose its heat rapidly, but is rather warmed by the sun at least to the level of the outside temperatures. Of course, this advantage will be more pronounced if transparent cover 22 is used, but cover 22 would not be nessary in mild climates.

The use of cover 22 requires that a fan 23 be installed to supply outside air and its heat content to the sprayed roof water.

Winter weather is usually cold and clear or cloudy with nearly normal temperatures. The present system can be designed to function well in such weather. However, a few days may be both cloudy and extremely cold. During such weather the present system makes use of the internal energy of water to supply heat, the amount of heat depending on the size of the brine tank. The heat pump, comprising compressor 30, lines 34 and 36, and valve 35, first remove the heat of the water by lowering its temperature. Water has an unusually high amount of internal energy, as indicated by its specific heat. Next, the heat pump removes the latent heat of fusion of water in containers 11. Then, the heat of fusion can be removed from the brine. All this heat can be restored during the next mild or sunny weather. In other words, the system can go into debt in extremely cold weather.

The present invention will be most useful in mild climates. In more northerly regions the brine will freeze, and a device like thermostat T will be required to stop the pump shown at 12, and some form of auxiliary heat will be necessary.

Outside thermostat To starts fan F whenever the temperature is above the melting point of the brine ice. The brine ice then melts, and thermostat T starts pump 12. The brine forced to the roof receives more heat and quickly melts all the briny ice and, if mild weather persists, also melts the ice in containers 11.

The water in containers 11 may also be furnished with antifreeze.

If transparent cover 22 is not used, some means to prevent rain water from washing away the brine is nessary. The box 53, secured by hinge 55, is ordinarily overbalanced to lie on the roof. However, when enough rain falls, it fills and tips over and closes valve 56. The rain water flowing from the roof then backs up to the more highly elevated outlet to downspout 51', shown in FIG. 2, and empties into container 11'. The container 11' is sized to overflow, ordinarily.

Wherever an auxiliary heater is acceptable, it may be located inside the dwelling unit. An alternative location is shown at AH in the brine tank of FIG. 1. A thermostat can start the heater whenever insufficient energy is present in the water to supply heat throughout any expected or probable period of bitter weather, thus building up a reserve.

An impervious, flexible liner 61 can be fitted to the ground and the foundation to form a relatively inexpensive brine tank. A compressable sheet 60 allows for expansion. However, a briny ice is usually mushy and would very likely not be a problem.

A dark substance mixed with the brine enhances the absorption of solar heat.

What is claimed is:

1. A dwelling unit having a roof, outer walls, and a foundation supporting the outer walls, a storage means comprising an impervious layer of material on the inside surface of the foundation and on the ground inside the foundation, said storage means containing water mixed with an antifreeze, at least one container inside the storage means, said container being at least partially filled with a liquid, a heat pump including a means to transfer heat from the water at relatively low temperatures to the air, at higher temperatures, in the dwelling unit, means to convey the water to the roof level and to expose said water to the sun and the environment whereby heat is restored to the water, means to return the water and its newly acquired heat energy to said storage means whereby the heat energy in the water is retainable by the water and the ground under the impervious layer, the said means to convey the water to the roof level including a means to spread the water on the roof of the dwelling unit, the said roof acting together with the water thereon as a solar heat collector, the liquid in said container being freezeable to release its heat of fusion and at least one of said containers containing a liquid which freezes at or below 32° F.

2. The combination of claim 1 wherein a coloring matter is added to the water to absorb radiant heat.

* * * * *